United States Patent Office 2,710,849
Patented June 14, 1955

2,710,849

PROCESS OF DYEING AROMATIC POLYESTERS

Erhard Siggel, Kleinwallstadt (Main), Germany

No Drawing. Application July 3, 1952,
Serial No. 297,159

Claims priority, application Germany July 5, 1951

4 Claims. (Cl. 260—40)

The present invention relates to a process of dyeing aromatic polyesters, and more particularly to a process of dyeing aromatic polyesters whereby a homogeneously dyed polyester is obtained.

In the past it has been tried to apply the known dyeing methods for the dyeing of aromatic polyesters such as polyethyleneterephthalate. It has been suggested to add to the melted polyester, shortly before the spinning thereof, an inorganic dye pigment so as to obtain dyed aromatic polyesters. However, these known processes only produced a very limited number of dye tones.

It is accordingly an object of the present invention to provide a process for dyeing aromatic polyesters so as to obtain a great variety of different colors and tones.

It is another object of the present invention to provide a simple process for dyeing aromatic polyesters whereby the polyester is homogeneously dyed and the dyed polyester is relatively color-fast.

It is still another object of the present invention to provide a process for dyeing aromatic polyesters and particularly polyethyleneterephthalate, which process is applicable to a large number of organic dyes and dye tones and which therefore very simply results in a homogeneously dyed aromatic polyester of the desired color.

With the above objects in view the present invention mainly comprises the steps of dissolving an aromatic polyester and an organic dye soluble in said polyester in a solvent for both said polyester and said dye so as to form a homogeneous solution of said polyester and said dye dissolved in said solvent; and precipitating from said solution said polyester having said dye dissolved therein, thereby obtaining a homogeneously dyed polyester.

A simple method of carrying out the process of the present invention comprises dissolving the polyester and the dye soluble in said polyester in a hot organic solvent for both said dye and said polyester. The hot solution formed thereby upon cooling directly precipitates the polyester and the dye dissolved in the polyester so that a homogeneously dyed polyester is simply obtained by this process.

According to a preferred embodiment of the present invention the organic dye which is used is preferably more soluble in the aromatic polyester such as polyethyleneterephthalate, than in the solvent or mixture of solvents.

The process of the present invention is particularly applicable to polyethyleneterephthalate as the aromatic polyester. The organic solvents which are used with the present invention may either be used alone or as a mixture of organic solvents. The results produced are substantially the same.

Among the common organic solvents which are solvents for both the aromatic polyester and the organic dye are those organic solvents having two cyclic nuclei which may be directly connected to each other or indirectly connected to each other by means of a O—, CO—, or (CH$_2$)$_n$— group wherein $n=1-4$. The cyclic nuclei may be partially or completely hydrogenated. The nuclei may also be substituted with a group such as CH$_3$—, CH$_3$O—, C$_2$H$_5$—, C$_2$H$_5$O—, C$_3$H$_7$—, and C$_3$H$_7$O—.

As examples of solvents of the above described type are the following: diphenyl, diphenyl ether, diphenyl methane, naphthalene, alpha methyl naphthalene, decahydronaphthalene, etc.

Polyethyleneterephthalate is easily dissolved in solvents of the above type by the application of temperatures of 160–240° C. At this temperature the dye which is soluble in both the solvent and the polyester, is simultaneously dissolved so that a homogeneous solution is obtained wherein the polyester and the dye are both dissolved in the solvent and wherein apparently the dye is dissolved in the polyester. Upon cooling of this solution a dyed polyethyleneterephthalate precipitates out of the solution. The precipitated, dyed polyethyleneterephthalate may then be washed with a low boiling solvent such as benzol, acetone, chloroform, etc., so as to remove any adhering constituents therefrom, particularly low molecular portions of the polyester and any original solvents adhering to the polyester. The applied dye is not dissolved by the low boiling solvent such as acetone etc. which is used to wash the dyed polyester.

The present invention is particularly applicable to dyes of the indanthrene series such as indanthrene marine blue G (corresponding to the dye tables of G. Schultz, vol. E2, 7th edition, page 202), indanthrene red FBB (7th edition of the dye tables of G. Schultz, vol. E1, page 106), indanthrene brown IG (vol. 1, No. 1, 219), indanthrene olive green (vol. 1, No. 1, 224), indanthrene orange RR (vol. E2, page 203) and indanthrene yellow 4GF (vol. E2, page 201).

The well dried, dyed polyester such as polyethyleneterephthalate can be formed into threads, films, foils and the like of dyed plastic. No dye particles are apparent, upon examination under a microscope of the products dyed according to the process of the present invention. The particular dye must be chosen according to the intended spinning process which is to be used on the dyed plastic. If the melting spinning process is intended to be used, then only thermo-stable dyes are suitable. The above mentioned indanthrene dyes are all thermo-stable.

The following examples are given as illustrative of the process of the present invention. It is to be understood, however, that the scope of said invention is not limited to these examples.

Example I 25 g. polyethyleneterephthalate are added to 120 cc. of a solution heated to 240° C., the solution consisting of indanthrene marine blue (corresponding to dye tables of G. Schultz, vol. E2, page 202) dissolved in alpha methylnaphthalene. The heated mixture is stirred until a homogeneous clear solution is formed. Upon cooling of the solution the polyester which is intensively and homogeneously dyed precipitates from the solvent which now contains only an extremely small amount of dye.

Example II 25 g. polyethyleneterephthalate is dissolved in 100 cc. of a warm diphenyl-diphenylether mixture. A clear solution of 200 mg. indanthrene yellow 4GF (dye tables, vol. E2, page 201) dissolved in 120 cc. of a mixture of diphenyl and diphenylether heated to 220° C. is added to the polyester solution. After about 10 minutes of stirring a homogeneous solution is formed. The solution is cooled to a temperature of less than 100° C. and diluted with 100 cc. of benzol so as to make the solution more filterable. The precipitated, amorphous, dyed polyethyleneterephthalate is filtered from the solvent, washed with benzol and dried. The resulting dyed polyester can be spun into dyed threads in the normal manner at 255° C.

*Example III*

25 g. polyethyleneterephthalate is added to a hot solution at a temperature of 220° C., the solution consisting of 250 mg. indanthrene brown YG (dye tables, vol. 1, No. 1, 219) dissolved in 150 cc. of diphenyl. After stirring for a few minutes a clear solution is formed which is cooled to about 80° C. and to which is added 150 cc. of benzol. The precipitated, homogeneously dyed polyethyleneterephthalate can then be treated in any of the customary manners to form threads, foils, etc. Upon microscopic examination no dyed particles are visible in the dyed polyester.

*Example IV*

25 g. polyethyleneterephthalate are dissolved in 120 cc. of warm diphenyl ether. To this solution is added a solution consisting of 150 mm. indanthrene red FBB (corresponding to dye tables, vol. E1, page 106) dissolved in 120 cc. decahydronaphthalene, the mixture stirred at a temperature of 190° C. until a homogeneous solution is formed. This solution is cooled as in Example I and the dyed polyester precipitated therefrom is separated from the solution.

*Example V*

25 g. polyethyleneterephthalate is added to a solution of 150 mg. indanthrene olive green (vol. 1, No. 1, 224) dissolved in 150 cc. diphenyloxide. The mixture is heated and stirred until a clear solution is formed. The solution is treated as in Example I to obtain a dyed polyester.

*Example VI*

200 mg. celliton blue B (corresponding to dye tables, vol. E1, page 75) is dissolved in 150 cc. methylnaphthalene. The solution is heated to 200–240° C. and 25 g. polyethyleneterephthalate is added thereto. The mixture is stirred until a clear solution is formed. Upon cooling, a dyed polyester precipitates from the solution in amorphous form, and is separated from the solvent by filtration. The polyester can then be washed with benzol and treated in the usual manner to form a dyed powder.

*Example VII*

250 mg. celliton red R (vol. E1, page 76) is dissolved in 200 cc. diphenylmethane. The solution is heated to 190–250° C. and 25 g. polyethyleneterephthalate is added thereto. The mixture is stirred until a clear solution is formed, and upon cooling a dyed product is obtained which can be further worked in any customary manner.

*Example VIII*

250 g. palatinecht blue (vol. E1, page 116) is dissolved in 200 cc. diphenyl. 25 g. polyethyleneterephthalate is added to the solution and the mixture stirred until a homogeneous solution is formed. Upon cooling the dyed polyester is obtained.

*Example IX*

25 g. polyethyleneterephthalate is, analogously to Example IV, added to a solution of 250 mg. palatinecht blue (vol. E1, page 118) dissolved in 150 cc. diphenylether. The resulting mixture is stirred until a clear solution is formed. The dyed polyester is obtained from the solution by cooling, as above described.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process of dyeing aromatic polyesters, comprising the steps of dissolving polyethyleneterephthalate and an indanthrene dye soluble in said polyethyleneterephthalate in alpha methyl naphthalene as solvent for both said polyethyleneterephthalate and said indanthrene dye so as to form a homogenous solution of said polyethyleneterephthalate and said dye dissolved in said solvent; and precipitating from said solution said polyethyleneterephthalate having said dye dissolved therein, thereby obtaining a homogeneously dyed polyethyleneterephthalate.

2. A process of dyeing aromatic polyesters, comprising the steps of dissolving polyethyleneterephthalate and an indanthrene dye soluble in said polyethyleneterephthalate in diphenyl as solvent for both said polyethyleneterephthalate and said indanthrene dye so as to form a homogeneous solution of said polyethyleneterephthalate and said dye dissolved in said solvent; and precipitating from said solution said polyethyleneterephthalate having said dye dissolved therein, thereby obtaining a homogeneously dyed polyethyleneterephthalate.

3. A process of dyeing aromatic polyesters, comprising the steps of dissolving polyethyleneterephthalate and an indanthrene dye soluble in said polyethyleneterephthalate in diphenyl ether as solvent for both said polyethyleneterephthalate and said indanthrene dye so as to form a homogeneous solution of said polyethyleneterephthalate and said dye dissolved in said solvent; and precipitating from said solution said polyethyleneterephthalate having said dye dissolved therein, thereby obtaining a homogeneously dyed polyethyleneterephthalate.

4. A process of dyeing aromatic polyesters, comprising the steps of dissolving polyethyleneterephthalate and an indanthrene dye soluble in said polyethyleneterephthalate in a solvent for both said polyethyleneterephthalate and said indanthrene dye and being selected from the group consisting of diphenyl, diphenyl ether, diphenyl methane, naphthalene, alpha methyl naphthalene, and decahydronaphthalene so as to form a homogeneous solution of said polyethyleneterephthalate and said dye dissolved in said solvent; and precipitating from said solution said polyethyleneterephthalate having said dye dissolved therein, thereby obtaining a homogeneously dyed polyethyleneterephthalate.

References Cited in the file of this patent

FOREIGN PATENTS 651,694  Great Britain _____ Apr. 4, 1951